(12) United States Patent
Hiron

(10) Patent No.: US 7,776,378 B2
(45) Date of Patent: *Aug. 17, 2010

(54) CANOLA PROTEIN ISOLATE FUNCTIONALITY III

(75) Inventor: Shelley Hiron, Winnipeg (CA)

(73) Assignee: Burcon Nutrascience (MB) Corp., Winnipeg, Manitoba (CA)

( * ) Notice: Subject to any disclaimer, the term of this patent is extended or adjusted under 35 U.S.C. 154(b) by 763 days.

This patent is subject to a terminal disclaimer.

(21) Appl. No.: 11/589,204

(22) Filed: Oct. 30, 2006

(65) Prior Publication Data

US 2007/0098876 A1    May 3, 2007

Related U.S. Application Data

(63) Continuation of application No. 10/384,699, filed on Mar. 11, 2003, now Pat. No. 7,211,288.

(60) Provisional application No. 60/363,283, filed on Mar. 12, 2002, provisional application No. 60/383,773, filed on May 30, 2002.

(51) Int. Cl.
    *A23J 1/00* (2006.01)
(52) U.S. Cl. ............... 426/656; 426/634; 426/598; 426/590; 426/635; 426/629
(58) Field of Classification Search ............... 426/634, 426/598, 590, 635, 656, 629
See application file for complete search history.

(56) References Cited

U.S. PATENT DOCUMENTS

| | | | |
|---|---|---|---|
| 4,169,090 A | 9/1979 | Murray et al. | |
| 4,208,323 A | 6/1980 | Murray et al. | |
| 4,285,862 A | 8/1981 | Murray et al. | |
| 4,418,013 A | 11/1983 | Cameron et al. | |
| 5,844,086 A | 12/1998 | Murray et al. | |
| 6,005,076 A | 12/1999 | Murray et al. | |
| 7,001,990 B2 * | 2/2006 | Hiron et al. | 530/370 |
| 7,211,286 B2 * | 5/2007 | Hiron | 426/598 |
| 7,211,288 B2 * | 5/2007 | Hiron | 426/656 |

FOREIGN PATENT DOCUMENTS

| | | |
|---|---|---|
| DE | 23 22 462 | 11/1974 |
| GB | 2077739 | * 12/1981 |

OTHER PUBLICATIONS

Morris, Charles. "New Technology Isolates Canola Protein". Food Engineering. Published May 1, 2001.*
Murray et al. Asia Pacific Industry. Apr. 2001. pp. 30-34.*
Murray et al. "Rapeseed: a potencial global source of high quality plant protein" pp. 30-34. XP002207606, Apr. 2001.
Yew-Min Tzeng et al: Preparation of rapeseed protein isolate by sodium hexamethaphosphate extraction, ultrafiltration, diafiltratin and ion-exchange. Bo. 53, No. 5. Sep. 1, 1988.
Morris, Charles, "New Technology Isolates Canola Protein" Food Engineering , Published May 1, 2001.

* cited by examiner

*Primary Examiner*—Anthony Weier
(74) *Attorney, Agent, or Firm*—Sim & McBurney

(57) ABSTRACT

A canola protein isolate having a protein of at least about 90 wt % (N×6.25) is employed as an at least partial replacement for at least one component providing functionality in a food composition. The canola protein isolate is a dried concentrated supernatant from the settling of a solid phase of a dispersion of canola protein micelles.

6 Claims, No Drawings

US 7,776,378 B2

CANOLA PROTEIN ISOLATE FUNCTIONALITY III

REFERENCE TO RELATED APPLICATIONS

This application is a continuation application of U.S. application Ser. No. 10/384,699 filed Mar. 11, 2003, now U.S. Pat. No. 7,211,288, which claims priority under 35 USC 119(e) from U.S. Provisional Patent Application Nos. 60/363,283 filed Mar. 12, 2002 and 60/383,773 filed May 30, 2002.

FIELD OF INVENTION

The present invention relates to a canola protein isolate and its functionality in a wide range of applications.

BACKGROUND TO THE INVENTION

In U.S. Pat. Nos. 5,844,086 and 6,005,076 ("Murray II"), assigned to the assignee hereof and the disclosures of which are incorporated herein by reference, there is described a process for the isolation of protein isolates from oil seed meal having a significant fat content, including canola oil seed meal having such content. The steps involved in this process include solubilizing proteinaceous material from oil seed meal, which also solubilizes fat in the meal and removing fat from the resulting aqueous protein solution. The aqueous protein solution may be separated from the residual oil seed meal before or after the fat removal step. The defatted protein solution then is concentrated to increase the protein concentration while maintaining the ionic strength substantially constant, after which the concentrated protein solution may be subjected to a further fat removal step. The concentrated protein solution then is diluted to cause the formation of a cloud-like mass of highly aggregated protein molecules as discrete protein droplets in micellar form. The protein micelles are allowed to settle to form an aggregated, coalesced, dense amorphous, sticky gluten-like protein isolate mass, termed "protein micellar mass" or PMM, which is separated from residual aqueous phase and dried.

The protein isolate has a protein content (as determined by Kjeldahl N×6.25) of at least about 90 wt %, is substantially undenatured (as determined by differential scanning calorimetry) and has a low residual fat content of less than about 1 wt %. The yield of protein isolate obtained using this procedure, in terms of the proportion of protein extracted from the oil seed meal which is recovered as dried protein isolate was generally less than 40 wt %, typically around 20 wt %.

The procedure described in the aforementioned patents was developed as a modification to and improvement on the procedure for forming a protein isolate from a variety of protein source materials, including oil seeds, as described in U.S. Pat. No. 4,208,323 (Murray IB). The oil seed meals available in 1980, when U.S. Pat. No. 4,208,323 issued, did not have the fat contamination levels of canola oil seed meals available at the time of the Murray II patents, and, as a consequence, the procedure of U.S. Pat. No. 4,208,323 cannot produce from the current oil seed meals processed according to the Murray II process, proteinaceous materials which have more than 90 wt % protein content. There is no description of any specific experiments in U.S. Pat. No. 4,208,303 carried out using rapeseed (canola) meal as the starting material.

U.S. Pat. No. 4,208,323 itself was designed to be an improvement on the process described in U.S. Pat. Nos. 4,169,090 and 4,285,862 Murray IA) by the introduction of the concentration step prior to dilution to form the PMM. The latter step served to improve the yield of protein isolate form around 20 wt % for the Murray IA process.

In copending U.S. Patent Applications Nos. 60/288,415 filed May 4, 2001, 60/326,987 filed Oct. 5, 2001, 60/331,066 filed Nov. 7, 2001, 60/333,494 filed Nov. 28, 2001, 60/374,801 filed Apr. 24, 2002 and 10/137,391 filed May 3, 2002, assigned to the assignee hereof and the disclosures of which are incorporated herein by reference, there are described further improvements on these prior art protein isolation procedures as they apply to oil seeds to obtain improved yields of dried product protein isolate in terms of the proportion of the protein extracted from the oil seeds which is recovered as protein isolate and to obtain protein isolate of high purity, usually at least about 100 wt % at a Kjeldahl nitrogen (N) conversion rate of N×6.25. The procedure is employed particularly to produce a canola protein isolate.

In the procedure described in the aforementioned U.S. patent applications, the oil seed meal is extracted with an aqueous food grade salt solution. The resulting protein extract solution, after an initial treatment with pigment adsorbing agent, if desired, is reduced in volume using ultrafiltration membranes to provide a concentrated protein solution having a protein content in excess of about 200 g/L. The concentrated protein solution then is diluted into chilled water having a temperature below about 15° C., resulting in the formation of a white cloud of protein micelles which are allowed to separate. Following removal of the supernatant, the precipitated, viscous sticky mass (PMM) is dried.

In one embodiment of the process described in the aforementioned U.S. Patent Application No. 60/288,415 as it is applied to canola protein isolate and as described in copending U.S. Patent Applications Nos. 60/326,987, 60/331,066 60/333,494, 60/374,801 and Ser. No. 10/137,391, the supernatant from the PMM settling step is processed to recover a protein isolate comprising dried protein from the wet PMM and supernatant. This may be effected by initially concentrating the supernatant using ultrafiltration membranes, mixing the concentrated supernatant with the wet PMM and drying the mixture. The resulting canola protein isolate has a high purity of at least about 90 wt % protein, preferably at least about 100 wt %, at a Kjeldahl conversion rate N×6.25.

In one embodiment of the process described in the aforementioned U.S. Patent Application No. 60/288,415 as it is applied to canola protein isolate and as described in copending U.S. Patent Applications Nos. 60/331,066, 60/333,494, 60/363,283, 60/374,801 and Ser. No. 10/137,390, the supernatant from the PMM settling step is processed to recover a protein isolate therefrom. This may be effected by initially concentrating the supernatant using ultrafiltration membranes and drying the concentrate. The resulting canola protein isolate has a high purity of at least about 90 wt %, preferably at least 100 wt %, at a Kjeldahl conversion rate N×6.25.

In copending U.S. Patent Applications Nos. 60/331,646 filed Nov. 20, 2001, 60/383,809 filed May 30, 2002 and Ser. No. 10/298,678 filed Nov. 19, 2002, assigned to the assignee hereof and the disclosures of which are incorporated herein by reference, there is described a continuous process for making canola protein isolates. In accordance therewith, canola oil seed meal is continuously mixed with a food grade salt solution, the mixture is conveyed through a pipe while extorting protein from the canola oil seed meal to form an aqueous protein solution, the aqueous protein solution is continuously separated from residual canola oil seed meal, the aqueous protein solution is continuously conveyed through a selective membrane operation to increase the protein content of the aqueous protein solution to at least about 200 g/L while maintaining the ionic strength substantially constant, the resulting concentrated protein solution is continuously mixed with chilled water to cause the formation of protein micelles, and the protein micelles are continuously permitted to settle while the supernatant is continuously overflowed until the desired amount of protein micellar mass has accumulated in the settling vessel. The protein micellar mass is removed from the settling vessel and may be dried. The protein micellar mass has a protein content of at least about 100 wt % as determined by Kjeldahl nitrogen (N×6.25). As in the case of the aforementioned pending U.S. patent applications, the overflowed supernatant may be proceeded to recover a protein isolate comprising dried protein from the wet PMM and supernatant. This procedure also may be effected on a semi-continuous basis.

As described in copending U.S. Applications Nos. 60/332,165 filed Apr. 15, 2002 and 60/430,687 filed Dec. 4, 2002, assigned to the assignee hereof and the disclosures of which are incorporated herein by reference, the settled PMM and protein derived from the supernatant have different relative proportions of the 12S, 7S and 2S proteins of canola. The PMM derived protein isolate, having a protein content of at least about 90 wt %, preferably at least about 100 wt %, has a protein component content of about 60 to about 98 wt % of 7S protein, about 1 to about 15 wt % of 12S protein and 0 to about 25 wt % of 2S protein. The supernatant-derived canola protein isolate having a protein content of at least about 90 wt %, preferably at least about 100 wt %, has a protein component content of 0 to about 5 wt % of 12S protein, about 5 to about 40 wt % of 7S protein and about 60 to about 95 wt % of 2S protein.

Canola is also termed rapeseed or oil seed rape.

SUMMARY OF INVENTION

It has now been found that the high purity canola protein isolate produced from supernatant by the procedure of the aforementioned pending parent applications has broadly based functionality in food products, unique among proteinaceous materials. The ability to utilize a protein which is vegetable in origin in food products enables truly vegetarian food products to be provided in instances where egg white and/or animal derived protein have been used in the absence of any available substitute.

In one aspect of the present invention, there is provided in a food composition comprising a foodstuff and at least one component providing functionality in said food composition, the improvement which comprises at least partially replacing said at least one component by a substantially undenatured canola protein isolate having a protein content of at least about 90 wt %, as determined by Kjeldahl nitrogen×6.25 on a dry weight basis, said canola protein isolate exhibiting a protein profile which is about 60 to about 95 wt % of 2S protein; about 5 to about 40 wt % of 7S protein; 0 to about 5 wt % of 12S protein.

The canola protein isolate may be in the form of dried concentrated supernatant from the settling of the solid phase from an aqueous dispersion of protein micelles.

The canola protein isolate may be used in conventional applications of protein isolates, such as protein fortification of processed foods, emulsification of oils in water, body formers in baked foods and foaming agents in products which entrap gases. The canola protein isolate also has functionalities not exhibited by the source material and isoelectric precipitates.

The canola protein isolate has certain functionalities in common with the products described in the prior art Murray I patents, including the ability to be formed into protein fibers, the ability to be used as an egg white substitute or extender in food products where egg white is used as a binder. As described herein, the canola protein isolate has other functionalities.

Protein functionality can be categorized into several properties. The following Table I lists these functionalities, food products wherein such protein functionality is provided and protein commonly employed for such purpose:

TABLE I

| Property | Food Product | Protein |
| --- | --- | --- |
| 1. Solubility | Beverages | Egg and whey proteins |
| 2. Viscosity | Dressings, deserts | Gelatin |
| 3. Water binding | Sausages, cakes | Meat protein, egg protein |
| 4. Gelation | Yoghurts, desserts, cheese | Egg and milk proteins, gelatin |
| 5. Cohesion/adhesion | Meats, sausage, pasta | Egg and whey proteins |
| 6. Elasticity | Meats, baked goods | Egg and whey proteins, meat protein |
| 7. Emulsification | Sausages, dressings | Egg and milk proteins |
| 8. Foaming | Toppings, nougats, ice cream | Egg and milk proteins |
| 9. Fat binding | Baked goods, doughnuts | Egg and milk proteins, gluten |
| 10. Film forming | Buns and breads | Egg protein |
| 11. Fiber forming | Meat analogs | Soy protein |

(* This Table I is derived in part from Food Chemistry, Third Edition, 1996, Ed. Owen Fennema, Marcel Dekkar Inc., page 366).

As may be seen from Table I, egg protein has a wide scope of functionality but not as broad as the canola protein isolate of the present invention. However, the canola protein isolate may be utilized in each of these applications to replace the protein commonly used to provide the specific functional properties. In general, the canola protein isolate can replace or extend the existing protein product. In addition, the canola protein isolate has a high quality amino acid profile, bland flavour profile and does not possess detrimental flavour characteristics nor nutritional factors which would adversely affect its employment in food product applications.

In the functionalities recited in Table I, certain ones are similar and possibly complementary, so that the functionalities can be classified in categories, as follows:

| Group | Categories |
| --- | --- |
| A | #8 Foaming and #10 Film Forming |
| B | #1 Solubility and #3 Water Binding |
| C | #5 Cohesion/Adhesion |
| D | #2 Viscosity (thickening), #4 Gelation and #6 Elasticity |
| E | #7 Emulsification and #9 Fat Binding |
| F | #11 Fiber Forming |

GENERAL DESCRIPTION OF INVENTION

Solubility

As noted above, one of the functions possessed by the canola protein isolate is solubility in aqueous media, such as water. The canola protein isolate is highly soluble in water in the presence of sodium chloride, being less so in the absence of sodium chloride. The solubility of the protein changes under various pH levels, temperatures and sodium concentrations. Milk is a protein dispersion containing about 4 wt % protein dispersed in the aqueous phase. Liquid egg white, used in a variety of food applications, contains about 10 wt % egg proteins.

An example where such protein foods may be employed, at the appropriate concentration, is in a protein beverage.

Viscosity:

As noted above, one of the functions possessed by the canola protein isolate is the ability to act as a thickening agent for increasing viscosity in various food products. The canola protein isolate may be used as a replacement for gelatin, starches and xanthan gums commonly used for this purpose in, for example, soft cheeses, dressings, desserts, such as Jello® pudding, and sauces.

Water Binding:

Water binding properties of proteins are used in sausages and cakes to retain moisture in the cooked product. The canola protein isolate can be used to replace, partially or completely, the egg and meat proteins commonly used for this purpose in these products.

Gelation:

The gelation properties of proteins is used in yoghurts, desserts and cheese as well as in various meat analogs, such as a bacon analog. Egg and milk proteins as well as gelatin, commonly used for this purpose, may be replaced, partially or completely, by the canola protein isolate provided herein.

Cohesion/Adhesion:

A variety of meats, sausage and pasta utilize egg protein and/or whey protein for these properties in their formulation to bind food components together and then to become coagulated upon being heated. The canola protein isolate can replace, partially or completely, such commonly used proteins and provide the required functions.

One application of these properties is a veggie burger, where egg white, commonly used to provide cohesion/adhesion of the ground-meat replacement can be replaced by the canola protein isolate. Other possibilities are meat loaf and meat balls, again as a replacement for egg protein.

Elasticity:

The canola protein isolate can replace, partially or completely, the egg and meat proteins in meats, used for these purposes. An example of the replacement of meat is in a veggie burger.

Emulsification:

Egg white, egg yolk and milk proteins are commonly used in sausages, meat analogs, simulated adipose tissue, and salad dressings for this property to achieve emulsification of fats and oils present in such products. The canola protein isolate may be used as a replacement, partially or completely, for the egg and milk proteins to provide the property.

Foaming:

The foaming properties of egg white and milk protein to provide a stable aerated structure, used in such products as ice cream, nougats, macaroons and meringues, may be reproduced by utilization of the canola protein isolate.

Fat Binding:

Egg and milk proteins have commonly been used in baked goods and doughnuts for fat binding properties. The canola protein isolate can replace such materials, partially or completely, and provide the required property. Such property may be employed in cookie mixes.

Film Forming:

The canola protein isolate can be used for its film-forming properties in breads and buns. Film-forming properties also may be used to provide edible coating on fruits, such as apples.

Fiber Forming:

The canola protein isolate can be formed into protein fibres by a fiber forming procedure, such as described in U.S. Pat. Nos. 4,328,252, 4,490,397 and 4,501,760. Such protein fibers may be used for their chewy texture in a variety of meat analogs, such as a meat snack analog, meatless breakfast sausage, a bacon analog, simulated adipose tissue, and a seafood analog, such as shrimp and crabmeat analogs, as well as other food products.

The canola protein isolate, derived from supernatant, therefore, provides a replacement for a variety of food ingredients (both proteinaceous and non-proteinaceous) to provide a broad spectrum of functionality not previously observed. The canola protein isolate replaces egg white, egg yolk, soy protein, xanthan gum, gelatin and milk protein in a variety of food products. The canola protein isolate is bland in taste and does not need to be used with strong flavours or spices.

In the Examples which follow, specific application of the wide functionality of the canola protein isolate is exemplified.

EXAMPLES

The invention is illustrated by the following Examples:

Example 1

This Example illustrates the preparation of canola protein isolate samples for testing the functionality of the protein.

'a' kg of commercial canola meal was added to 'b' L of 0.15 M NaCl solution at ambient temperature and agitated for 'c' minutes to provide an aqueous protein solution having a protein content of 'd' g/L. The residual canola meal was removed and washed on a vacuum filter belt. The resulting protein solution was clarified by centrifugation to produce a clarified protein solution having a protein content of 'e' g/L.

The clarified protein solution was reduced in volume on an ultrafiltration system using a 3,000 dalton molecular weight cutoff membrane. The resulting concentrated protein solution had a protein content of 'f' g/L.

The concentrated solution at 'g' ° C. was diluted 1: 'h' into 39° F. (4° C.) water. A white cloud immediately formed and was allowed to settle. The upper diluting water was removed and was reduced in volume by ultrafiltration using a 3,000 dalton molecular weight cut-off membrane by a volume reduction factor of 'i'. The concentrate was dried and the dried protein which was formed had a protein content of 'j' wt % of protein (N×6.25). The canola protein isolate product was given code number 'k'.

The specific parameters 'a' to 'k' for the different samples of protein isolate are set forth in the following Table II:

TABLE II

| k | a | b | c | d | e | f | g | h | i | j |
|---|---|---|---|---|---|---|---|---|---|---|
| BW-AL016-J24-01A-C200 | 1200 | 8000 | 30 | 22.7 | 16.9 | 281.0 | 37 | 10 | 16 | 103.9 |
| A8-16 | 150 | 1000 | 30 | 13.1 | 11.3 | 316.5 | 30 | 18 | 36 | 91.8 |

Example 2

This Example illustrates other preparation of canola protein isolate samples for testing the functionality of the protein.

'a' kg of commercial canola meal was added to 'b' L of 0.15 M NaCl isolation at ambient temperature in the presence of 'c' kg of ascorbic acid. The mixture was agitated for 30 minutes to permit an aqueous protein solution having a protein content of 'd' g/L. The residual canola meal was removed and washed on a vacuum filter belt. The resulting protein solution had a protein content of 'e' g/L.

'f' L of the clarified protein solution was reduced in volume to 'g' L using an ultrafiltration system using a 5,000 dalton molecular weight cut-off membrane. The 'g' L of ultrafiltered protein solution was diafiltered with 'h' L of an aqueous 0.15 M NaCl solution containing 0.05% ascorbic acid using the same membranes for one hour to provide 'i' L of diafiltered solution.

The diafiltered solution was pasteurized in a jacketed kettle at 65° C. for 5 minutes and cooled to 'j' ° C.

The concentrated solution was diluted 1:15 into 39° F. (4° C.) water. A white cloud immediately formed and was allowed to settle. The upper diluting mass was removed and was reduced in volume by ultrafiltration using a 5,000 dalton molecular weight cut-off membrane to 'k' L. In the case of product BW-AL018-E29-02A-C200, the concentrate also was diafiltered with 125 L of water for one hour to provide a final volume of 21.25 L.

The ultrafiltered (BW-AL017-D11-02A-C200) and diafiltered (BW-AL018-E29-02A-C200) solution was pasteurized in a jacketed kettle at 65° C. for 5 minutes and cooled to 'l' ° C. The pasteurized solution then was spray dried. The dried protein which was formed had a protein content of 'm' wt % of protein (N×6.25). The canola protein isolate product was given code number 'n'.

The specific parameters 'a' to 'n' for the different samples of protein isolates are set forth in the following Table III:

TABLE III

| n | a | b | c | d | e | f | g | h | i | j | k | l | m |
|---|---|---|---|---|---|---|---|---|---|---|---|---|---|
| BW-AL017-D11-02A-C200 | 1200 | 8000 | 4 | 26.3 | 17.7 | 5882 | 552 | 1500 | 1270 | 30 | 44.5 | 17.6 | 98.7 |
| BW-AL018-E29-02A-C200 | 150 | 1000 | 0.5 | 24.4 | 17.8 | 820 | 25 | 250 | 24 | 12.9 | 25 | 12.8 | 97.5 |

Example 3

This Example illustrates the utilization of the canola protein isolate in a baked meringue.

The foaming properties of canola protein isolate were illustrated in the preparation of a baked meringue as a replacement for egg white conventionally used in such products. The canola protein isolate used was A8-16, prepared as described in Example 1. The composition is set forth in the following Table IV:

TABLE IV

| Ingredient | Amount (g) | Percentage (%) |
|---|---|---|
| A8-16 | 11.6 | 3.6 |
| Water | 85.2 | 26.0 |
| Salt | 0.4 | 0.1 |
| Sugar (1) | 161.7 | 49.3 |
| Sugar (2) | 55.3 | 16.9 |
| Cornstarch | 8.9 | 2.7 |
| Lemon Juice | 4.7 | 1.4 |
| Total | 327.8 | 100.0 |

Canola protein isolate, salt and water were placed in a Hobart bowl. The protein was dispersed by manually stirring the solution with the whisk attachment until all the protein was wet. The mixture was then automatically whisked at speed 3 for 2 minutes. Sugar (1) was added gradually while mixing at speed 3 for 1 minute and 15 seconds. The sides and bottom of the bowl were then scraped with a rubber spatula. The solution was blended for an additional 5 seconds. The cornstarch and sugar (2) were preblended using a fork in a separate bowl. The dry blend and lemon juice were gently folded into the whipped mixture using a rubber spatula (about 20 folds). The mixture was transferred into a piping bag and piped onto parchment lined baling sheets. The meringues were baked at 200° F. (93° C.) for 3 hours on the middle oven rack. After baking, the oven was shut off and the meringues were left in the oven overnight with the oven light on.

The baked meringues had a crisp, sugary and powdery texture. They had a light colour and a slightly rounded shape. During preparation, the canola protein isolate showed foaming characteristics similar to egg white, such as foam density (0.28 g/ml for Supertein and 0.32 g/ml for shell egg white).

Example 4

This Example illustrates the utilization of the canola protein isolate in cake doughnuts.

Cake doughnuts were prepared using canola protein isolate A8-16, prepared as described in Example 1, to replace whole egg to illustrate the fat binding and cohesion/adhesion properties of the isolate. Egg products contribute to the richness and tenderness of the doughnut and generally improve the eating quality of the product.

The cake doughnuts contained the ingredients set forth in the following Table V:

TABLE V

| Ingredient | Amount (g) | Percentage (%) |
|---|---|---|
| All purpose flour (1) | 237.5 | 23.2 |
| All purpose flour (2) | 243.2 | 23.8 |
| Sugar, white | 217.7 | 21.3 |
| Baking powder | 16.2 | 1.6 |
| Salt | 3.0 | 0.3 |
| Cinnamon | 2.3 | 0.2 |
| Butter | 23.6 | 2.3 |
| A8-16 | 12.3 | 12 |
| Water | 90.3 | 8.8 |
| Milk | 176.5 | 17.3 |
| Total | 1022.6 | 100.0 |

The sugar, baking powder, salt, cinnamon, protein and flour (1) were manually blended in the Hobart bowl using a fork. The butter, water and milk were added. The mixture was blended at speed 1 for 30 seconds using the paddle attachment. The bottom and sides of the bowl were then scraped with a rubber spatula. The mixture was blended for an additional 2 minutes at speed 2 then scraped again. The remaining flour (2) was then added while blending at speed 1 for 1 minute The dough was scraped from the Hobart bowl and placed on a well-floured cutting board. The dough was kneaded into a ball and rolled flat with a floured rolling pin to ¼ inch thickness. The dough was then cut with a floured doughnut cutter and the cut pieces were carefully placed on a parchment lined baking sheet. The pieces were deep fried at 374° F. (190° C.) for 60 seconds on each side in a SEB Safety Super Fryer Model 8208.

The cake doughnuts had a smooth exterior surface, an appealing golden fried colour and a firm outer texture. The interior was soft and bread-like with a light cinnamon odour and flavour.

Example 5

This Example illustrates the utilization of the canola protein isolate in yeast doughnuts.

Yeast doughnuts were produced using canola protein isolate A8-16, prepared as described in Example 1, as a replacement for whole eggs in the formulation to illustrate fat binding and cohesion/adhesion properties of the canola protein isolate. Egg products can improve the eating quality, crust colour and shelf-life of doughnuts although high-quality doughnuts are also being produced without egg products. A breadmaker was used in the production of the dough. The formulation for yeast doughnuts utilized is listed in Table VI:

TABLE VI

| Ingredient | Amount (g) | Percentage (%) |
|---|---|---|
| Yeast | 5.4 | 1.0 |
| All purpose flour | 257.8 | 48.7 |
| Nutmeg | 2.2 | 0.4 |
| Salt | 6.8 | 1.3 |
| Sugar, White, fine | 56.6 | 10.7 |
| Butter | 42.8 | 8.1 |
| A8-16 | 6.0 | 1.1 |
| Water | 151.9 | 28.7 |
| Total | 529.5 | 100.0 |

The bread pan was removed from the breadmaker and the water was added. The flour, nutmeg, salt, sugar and canola protein isolate were blended by hand and then added to the bread pan. The pan was tapped lightly on a flat surface to evenly distribute the ingredients. The butter was divided into four portions and each was placed at each corner of the bread pan. A well was formed in the center of the dry ingredients to where the yeast was added. The bread pan was locked into place in the Westbend Automatic Bread and Dough Maker, programmed to the 'Dough' setting, locked, and started. After the breadmaker program was completed, the dough was placed in a lightly greased bowl covered with film and allowed to rest for 10 minutes. After resting, the dough was rolled using a floured rolling pin to ¼ inch thickness on a well floured cutting board. The cut pieces were placed on a parchment lined baking pan, covered with film and allowed to rise for 60 minutes. The pieces were deep-fried in the SEB safety Super Fryer model 8208 at 374° F. (190° C.) for 45 seconds on each side.

The dough, prepared in a breadmaker was stretchy, pliable and soft. The doughnuts had a golden appearance, a soft bread-like interior texture and an outer texture that was slightly crisp. The flavour and texture of the doughnuts were comparable to the control product made with egg.

Example 6

This Example illustrates the utilization of the canola protein isolate in a vegetable mushroom burger.

The binding and adhesion/cohesion properties of canola protein isolate, BW-AL016-J24-01A-C200, prepared as described in Example 1, was demonstrated in the mushroom burgers. Canola protein isolate was used as a replacement for egg in the formulation.

The mushroom burgers contained the ingredients set forth in the following Table VII:

TABLE VII

| Ingredient | Amount (g) | Percentage (%) |
|---|---|---|
| Mushrooms, diced | 170.5 | 51.6 |
| Canola oil | 10.9 | 3.3 |
| Onion, minced | 50.2 | 15.2 |
| Bread crumbs | 53.4 | 16.1 |
| BW-AL016-J24-01A-C200 | 4.7 | 1.4 |
| Water | 34.8 | 10.5 |
| Salt | 1.1 | 0.3 |
| Ground pepper | 0.3 | 0.1 |
| Garlic clove, crushed | 5.1 | 1.5 |
| Total | 331.0 | 100.0 |

The onion and garlic were sautéed in oil for 2 minutes (setting 3 to 4). The burner setting was increased to 5 while the mushrooms were added and cooked until softened and all liquid had disappeared (approximately 6 minutes). After cooling, the mixture was cooled to room temperature. Salt and water were mixed together then the canola protein isolate was added, manually mixed and allowed to hydrate for 15 minutes. All ingredients were combined and 100 g patties were formed. The patties were cooked to an internal temperature >165° F. (74° C.) in a frying pan on setting 2-3 for 2 minutes on each side.

The pan-fried burgers exhibited good binding characteristics, they remained bound during the cooling process and did not fall apart during evaluation. The mushroom burgers had a moist texture and a strong onion and pepper flavour. The fried burgers had an appealing golden brown colour and a circular, flat surface.

Example 7

This Example illustrates the utilization of the canola protein isolate in frankfurters.

The binding properties of canola protein isolate, BW-AL016-J24-01A-C200, prepared as described in Example 1, was demonstrated in frankfurters. The formulation utilized for the frankfurters is listed on Table VIII:

TABLE VIII

| Ingredient | Amount (g) | Percentage (%) |
|---|---|---|
| Beef Trim (85% lean) | 183.3 | 35.7 |
| Pork Trim (60% lean) | 198.5 | 38.7 |
| Salt | 9.0 | 1.8 |
| Ice, chopped | 75.0 | 14.6 |
| Water | 25.0 | 4.9 |

TABLE VIII-continued

| Ingredient | Amount (g) | Percentage (%) |
|---|---|---|
| Sugar | 5.5 | 1.1 |
| Pickle cure compound | 1.2 | 0.2 |
| Sodium erythorbate | 0.3 | 0.1 |
| White pepper | 1.1 | 0.2 |
| Nutmeg | 0.6 | 0.1 |
| Phosphate | 0.2 | 0.0 |
| BW-AL016-J24-01A-C200 | 13.4 | 2.6 |
| Total | 513.1 | 100.0 |

The water and salt were mixed together and slowly whisked by hand into the canola protein isolate. This mixture was left to hydrate for 15 minutes. The pork and beef trim were ground separately through a ⅜ in. plate. The beef trim was chopped for approximately 1 to 2 minutes in a bowl chopper with the ice, salt, cure, erythorbate, phosphate, spice, sugar and protein mixture. Before chopping, the starting temperature of the beef should be maximum 35° F. (2° C.) and have a final chopping temperature of 40° F. (4° C.). The ground pork and remaining ice were added to the beef mixture and chopped for another 1 to 2 minutes in the bowl chopper to a temperature of 60.8° F. (16° C.). Hot dogs were formed from 100 g of meat emulsion, rolled in Saran Wrap and tied at both ends. The frankfurters were suspended in a loaf pan to allow fat to drain off. The pan was covered with foil and baked at 200° F. (93° C.) to an internal temperature of 185° F. (85° C.).

The frankfurters had a typical beef flavour and a strong meat odour. The product had a firm texture add pinkish interior and exterior and was similar to a control product made using soy protein.

Example 8

This Example demonstrates the use of canola protein isolate in a beverage formulation, namely a smoothie.

A smoothie was prepared using canola protein isolate A8-16, prepared as described in Example 1, illustrating the solubility and thickening properties of the canola protein isolate. The smoothie contained the ingredients set forth in the following Table IX:

TABLE IX

| Ingredient | Amount (g) | Percentage (%) |
|---|---|---|
| A8-16 | 7.3 | 2.6 |
| Prestige 540 | 7.3 | 2.6 |
| Fructose, crystalline | 18.3 | 6.4 |
| Vanilla flavour | 1.1 | 0.3 |
| Colloid ultrasmooth | 0.9 | 0.3 |
| Prosweet MM50 | 0.1 | 0.1 |
| Milk, skim | 250.0 | 87.7 |
| Total | 285.0 | 100.0 |

All ingredients, except the milk, were mixed manually to form a homogeneous dry blend. Flour tablespoons of milk were added into an Osterizer blender followed by the dry blend. The remainder of the milk was then added. The mixture was blended for 45 seconds. If required, the sides of the blender were scraped with a rubber spatula to remove unmixed powder and blended for an additional 5 seconds.

The smoothie had a creamy, frothy, bubbly appearance. It had a thick consistency and a stable suspension. The flavour was typical of a vanilla protein beverage made with soy.

Example 9

This Example illustrates the utilization of a canola protein isolate in forming texturized canola proteins.

The fiber-forming properties of canola protein isolate were illustrated in the preparation of texturized canola protein. Texturized canola protein was made using canola protein isolate by wetting spray dried canola protein isolate using the concentrations set forth in the following Table X:

TABLE X

| Ingredient | Amount (g) | Percentage (%) |
|---|---|---|
| BW-AL016-J24-01A-C200 | 20.2 | 66.0 |
| Water | 10.4 | 34.0 |
| Total | 30.6 | 100.0 |

Spray dried canola protein isolate and water were placed in a bowl. The protein was dispersed by manually sting the solution with a spoon until all the protein was wet. The liquid mixture was added to a 5 cc syringe and then extruded into water held between 95° C. (203° F.) and 99° C. (210° F.). Long spaghetti-like fibers formed along the surface of the water. The long protein stands were manually turned over to facilitate even heat treatment to both sides of the product. The strands were removed from the water and the excess water was removed using absorbent towels.

The fibers were soft and slightly brittle and had a light yellow colour.

Example 10

This Example illustrates the solubility of the canola protein isolate. The procedure used in this Example is that described in Methods of Testing Protein Functionality, Ed. G. M. Hall, Blackie Academic & Professional, 1996, p. 27.

10 g of dry canola protein isolate BW-AL016-J24-01A-C200, prepared as described in Example 1, was combined with 400 ml of distilled water in a 600 ml beaker to prepare a 2.5 wt % protein solution. The protein solution was blended by homogenizing for 2 minutes at 4500 rpm, until a smooth slurry was formed. The pH of the protein solution was determined and the solution split into equal volumes for pH adjustment, one for alkaline and the other for acid adjustment.

The pH of the protein solution was adjusted to 4.0, 4.5, 5.0, 5.5, 6.0, 6.5, 7.0, 7.5 and 8.0 with 0.1 M NaOH or 5% HCl. A small sample of each pH adjusted solution was collected for protein determination. 30 ml of the pH adjusted solutions were poured into 45 ml centrifuge vials and centrifuged for 10 minutes at 10,000 rpm. After centrifugation, the supernatant protein concentration for each of the pH adjusted samples was determined.

The % solubility of the protein was determined from the relationship:

$$\% \text{ Solubility} = \frac{\% \text{ protein after centrifugation}}{\% \text{ protein before centrifugation}} \times 100$$

The results obtained are set forth in the following Table XI:

TABLE XI

| pH | Average % Protein before Centrifugation (±0.2%) | Avenge % Protein after Centrifugation (±0.2%) | Average % Solubility |
|---|---|---|---|
| 4.0 | 4.17 | 4.00 | 95.72 |
| 4.5 | 4.07 | 4.10 | 100.74 |
| 5.0 | 4.15 | 4.10 | 98.80 |
| 5.5 | 4.15 | 4.05 | 93.59 |
| 6.0 | 4.13 | 3.93 | 95.16 |
| 6.5 | 3.85 | 3.16 | 82.08 |
| 7.0 | 4.20 | 3.50 | 83.33 |
| 7.5 | 3.92 | 3.34 | 82.65 |
| 8.0 | 3.94 | 3.38 | 85.79 |

As may be seen from the results in Table XI, the canola protein isolate was quite soluble at all pH's tested, but most was soluble around pH 4.0 to 6.0.

Example 11

This Example illustrates the foaming properties of the three separate batches of the canola protein isolate. The procedure utilized in this Example is that described in Phillips et al, J. Food Sci. 55:1441, 1990.

3.75 g samples of canola protein isolate BW-AL016-J24-01A-C200, prepared as described in Example 1, and canola protein isolates BW-AL017-D11-02A-C200 and BW-AL188-E29-02A-C200, prepared as described in Example 2, were placed into individual 150 ml beakers. 60 ml of 0.075 M NaCl solution was added to the protein, by initially making a paste to dissolve the protein with a few ml of liquid. The mixture was mixed on a stirrer with a magnetic stir bar for 10 minutes. The pH of the solution was adjusted to 7.00 with 0.1 M NaOH, and the solution stirred for another 10 minutes. The pH was re-adjusted to 7.00 and the volume of liquid was brought up to 75 ml with the required amount of 0.075M NaCl to yield a 5% w/v protein solution. The 75 ml of solution was poured into a Hobart Mixer bowl and the combined weight of solution, bowl and whisk attachment was recorded. The protein solution was whipped on speed 3 for 5 minutes.

Sufficient foam was gently scooped out to fill two tared 125 ml measuring cups using a rubber spatula. Excess foam was scraped off using the flat end of a large knife to level the top of the foam even with the top of the measuring cup and the weight of the foam was recorded. The foam was gently returned to the mixing bowl and whipped for another 5 minutes. This procedure then was repeated. The foam was gently returned to the mixing bowl and whipped for a further 5 minutes for 15 minutes in all. The procedure again was repeated.

The overrun was calculated from the following equation:

$$\% \text{ Overrun} = \frac{(\text{wt } 125 \text{ mL protein}) - (\text{wt } 125 \text{ mL foam})}{(\text{wt } 125 \text{ mL foam})} \times 100$$

The stability of the foam was also tested. The protein solution was prepared in the same manner as described for the % overrun measurements except the protein solution was whipped for 15 minutes on level 3. Using a rubber spatula, the foam was carefully transferred to into a 1 L long-necked funnel placed on top of a 250 ml graduated cylinder. A small amount of quartz wool was placed in the top of the funnel spout to prevent foam from draining while still allowing drainage of the liquid.

The volume of liquid that was collected in the graduated cylinder at 5, 10 and 15 minutes was measured. The volume held in the wool was added to the final volume.

The experiments were repeated for comparison with egg albumen, a whey protein isolate (Alacen 895—New Zealand Milk Products) and a soy protein isolate (Profam 891—Archer Daniels Midland). The results obtained are set forth in the following Tables XII, XIII, XIV and XV:

TABLE XII pH of Protein Solution after Stirring

| Protein Sample | pH after 10 minutes of stirring | pH after 20 minutes of stirring |
|---|---|---|
| Egg Albumen | 6.88 | 6.95 |
| Whey | 6.49 | 6.98 |
| Soy | 7.13 | 7.01 |
| BW-AL016-J24-01A-C200 | 5.26 | 7.03 |

TABLE XIII

Average wt of Foam

| Protein Sample | 5 minutes (g) | 10 Minutes (g) | 15 Minutes (g) |
|---|---|---|---|
| Egg Albumen | 10.16 | 6.42 | 6.57 |
| Whey | 17.35 | 13.48 | 9.76 |
| Soy | 63.26* | 58.53* | 49.74* |
| BW-AL016-J24-01A-C200 | 7.82 | 5.25 | 5.19 |
| BW-AL017-D11-02A-C200 | 4.87 | 4.01 | 3.94 |
| BW-AL018-E29-02A-C200 | 4.53 | 4.52 | 4.32 |

*Only one weight could be obtained because did not whip well.

TABLE XIV

Average % overrun

| Protein Sample | 5 minutes (%) | 10 Minutes (%) | 15 Minutes (%) |
|---|---|---|---|
| Egg Albumen | 1130.32 | 1847.04 | 1802.59 |
| Whey | 620.46 | 827.30 | 1180.74 |
| Soy | 97.60 | 113.57 | 151.31 |
| BW-AL016-J24-01A-C200 | 1498.47 | 2280.95 | 2308.48 |
| BW-AL017-D11-02A-C200 | 2466.74 | 3017.21 | 3072.59 |
| BW-AL018-E29-02A-C200 | 2675.22 | 2681.36 | 2810.13 |

*Assume weight of 125 ml of protein solution is 125 g.

TABLE XV

Volume of Protein Solution drained from Funnel

| Protein Sample | Drainage at 5 Min (ml) | Drainage at 10 Min (ml) | Drainage at 15 Min (ml) |
|---|---|---|---|
| Egg Albumen | 0.0 | 1.0 | 5.0 |
| Whey | 2.0 | 13.0 | 24.0 |
| Soy | N/A* | N/A* | N/A* |
| BW-AL016-J24-01A-C200 | 3.0 | 14.5 | 33.5 |
| BW-AL017-D11-02A-C200 | 0.0 | 1 | 11.5 |
| BW-AL018-E29-02A-C200 | 0.0 | 0.5 | 13 |

*The soy did not foam well. It plugged the wool with a gelatinous substance when poured into the funnel, and didn't drain out. Assume all 75 ml would drain out immediately.

As may be seen from the results of these Tables, the canola protein isolate created a nice foam. There was very little difference in the overrun between 5, 10 and 15 minutes for the albumen and the canola protein isolate BW-AL016-J24-01A-C200, indicating that these proteins reached their maximum foaming capacity in a shorter amount of time. The considerable amount of drainage from the foam after 15 minutes indicated a lack of foam stability for the canola protein isolate.

Example 12

This Example illustrates the oil holding capacity of the canola protein isolate. The procedure used in this Example is that described in Swift et al, Food Technol. 15, 436-72 (1961).

The recipe set forth in Table XVI was used to prepare an emulsion:

TABLE XVI

| Ingredient | Weight Added (g) |
| --- | --- |
| Canola Protein Isolate | 0.5 |
| Vinegar (No Name 5% acetic acid) | 55.2 |
| Canola Oil (CSP Foods) | N/D |
| Sugar (Rogers fine granulated | 4.1 |
| Salt (Sifto) | 1.2 |
| Distilled Water | 52.4 |

N/D = not determined

The sugar, salt and canola protein isolate, BW-AL016-J24-01A-C200 prepared as described in Example 1, or canola protein isolate BW-AL017-D11-02A-C200 or BW-AL018-E29-02A-C200 prepared as described in Example 2, were dry blended in a 600 ml beaker. The water and vinegar were nixed, by initially making a paste to dissolve the protein with a few ml of liquid. The mixture was mixed on a stirrer using a magnetic bar for 5 minutes. A 2000 ml beaker was filled with canola oil and the weight recorded A suction hose was placed in the oil.

The dispensing end of the hose was attached to a homogenizer and the pump was primed with oil using setting #1 to dispense approximately 40 to 50 ml/min. At the same time, the homogenizer (Silverson LHRT) was turned to 5,000 rpm and the pump switched on to disperse the oil. The point at which the emulsion was most viscous was visually observed. At the point of inversion, the pump and homogenizer were immediately switched off. The end of the suction hose was pinched with a clip to keep the oil in it and the weight of oil left in the 200 ml beaker was determined.

The experiment was repeated using egg yolk, xanthan gum Keltrol-Kelco Biopolymers) and soy protein isolate (PRDCD #066921—Archer Daniels Midland). The average oil holding capacity of the emulsions were determined for the various protein sources and the results obtained are set forth in the following Table XVII:

TABLE XVII

| Sample | Weight of Oil Added (g) | Volume of Oil Added (ml) |
| --- | --- | --- |
| Yolk | 163.07 | 146.93 |
| Xanthan | 88.09 | 79.37 |
| Soy | 91.50 | 82.44 |
| BW-AL017-J24-01A-C200 | 174.00 | 157.67 |
| BW-AL017-D11-02A-C200 | 355.73 | 320.51 |
| BW-AL018-E29-02A-C200 | 384.79 | 346.7 |

As may be seen from the results set forth in Table XVII, the canola protein isolate performed significantly better than xanthan gum and soy for oil holding capacity and the canola protein isolate performed very similar to egg yolk.

SUMMARY OF DISCLOSURE

In summary of this disclosure, the present invention provides a variety of food products wherein proteins used to provide a wide variety of functionalities are replaced, wholly or partially, by a highly pure canola protein isolate. Modifications are possible within the scope of the invention.

I claim:

1. A food composition, comprising:
a foodstuff, and
a substantially undenatured canola protein isolate having a protein content of at least about 90 wt %, as determined by Kjeldahl nitrogen×6.25 on a dry weight basis, said canola protein isolate exhibiting a protein profile which is:
about 60 to about 95 wt % of 2S protein,
about 5 to about 40 wt % of 7S protein, and
0 to about 5 wt % of 12S protein,
wherein said canola protein isolate is a dried concentrated supernatant from the settling of a solid phase from an aqueous dispersion of canola protein micelles.

2. The composition of claim 1 wherein said canola protein isolate has a protein content of at least about 100 wt % (N×6.25).

3. The composition of claim 1 which is a beverage.

4. A food composition, comprising:
a foodstuff, and
a substantially undenatured canola protein isolate having a protein content of at least about 90 wt %, as determined by Kjeldahl nitrogen×6.25 on a dry weight basis, said canola protein isolate being a dried concentrated supernatant from the settling of a solid phase from an aqueous dispersion of canola protein micelles.

5. The food composition of claim 4 wherein the canola protein isolate has a protein content of at least about 100 wt % (N×6.25).

6. The food composition of claim 4 which is a beverage.

* * * * *